O. P. NELSON.
CARBURETER WARMER.
APPLICATION FILED MAY 22, 1915.
1,160,192.
Patented Nov. 16, 1915.
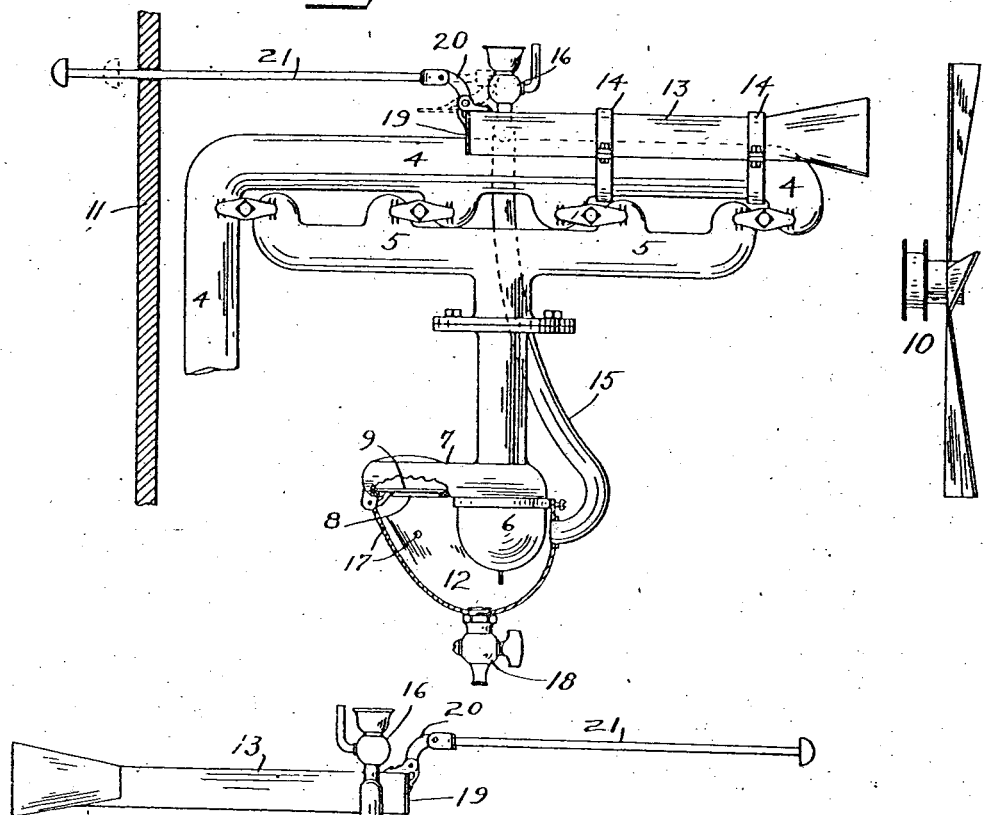
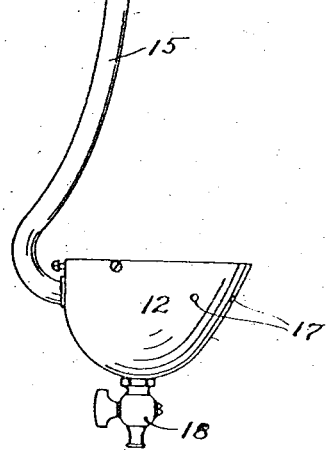
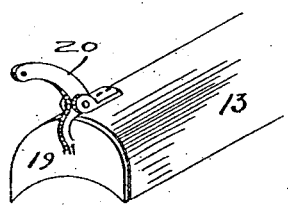
INVENTOR
O. P. NELSON
BY
Milton S. Crandall,
ATTORNEY

UNITED STATES PATENT OFFICE.

OLE P. NELSON, OF LYNN TOWNSHIP, LINCOLN COUNTY, SOUTH DAKOTA.

CARBURETER-WARMER.

1,160,192.  Specification of Letters Patent.  Patented Nov. 16, 1915.

Application filed May 22, 1915. Serial No. 29,726.

*To all whom it may concern:*

Be it known that I, OLE P. NELSON, a citizen of the United States, and a resident of Lynn township, in the county of Lincoln and State of South Dakota, have invented certain new and useful Improvements in Carbureter-Warmers, of which the following is a specification.

The present invention relates to means for heating the carbureters of gas-engines.

The invention has for its primary object the production of improved means for heating carbureters to facilitate carburation.

Another object of the invention is the production of improved means for conveying heat from the engine to the carbureter.

A further object of the invention is the production of improved means for humidifying the air entering the carbureter.

A still further object of the invention is the production of an improved carbureter-heater inexpensive in manufacture, highly efficient in operation and adapted for ready installation upon the majority of automobile engines.

With these and other objects in view, the invention, consisting in the construction, combination and novel arrangement of parts, will be fully understood from the following description, reference being had to the accompanying drawings, which form a part of this application and in which like characters of reference indicate corresponding parts throughout the several views, of which,—

Figure 1 is a fragmentary side elevation of a carbureter and portions of a vehicle motor equipped with the preferred embodiment of the invention, parts being cut away and shown in section; Fig. 2 is a side elevation, opposite to Fig. 1, of the device of the invention detached from the engine; and Fig. 3 is an enlarged perspective view of the rear portion of the heating-drum and its valve.

Although I have illustrated and hereinafter described the preferred embodiment of the invention, I would not be understood as being limited to the specific structure chosen for illustration, for various alterations and modifications in the details of construction and arrangement of parts, may be made without departing from the spirit and scope of the invention as defined in the appended claims.

The invention contemplates, broadly, a device including an air and water receptacle communicating with the air-inlet of the carbureter, and a valve-controlled heating-chamber adapted to receive air from the cooling-fan of the motor, heat the air and convey it to the receptacle, all of which will presently be made clear.

Referring now to the illustrations, 4 represents exhaust conductor or manifold of an automobile engine, and 5 the intake-manifold, which receives from a carbureter including a float-chamber, 6, and an air-chamber, 7, having an intake opening, 8, normally closed by an inwardly-opening valve, 9. At 10 is illustrated the cooling-fan and at 11 a portion of the dash of the vehicle.

12 is a suitable hot-air and water receptacle mounted below the carbureter to communicate with the air-inlet thereof, and preferably inclose the float-chamber.

Upon the exhaust-manifold is mounted an elongated semi-cylindrical heating-drum, 13, secured to the manifold by bands, 14, or otherwise. The forward end of the drum is preferably funnel-shaped to receive air from the cooling fan. The rear portion of the heating drum communicates with the receptacle through a suitable tube, or pipe, 15.

For conveniently introducing water into the receptacle, a valve-controlled funnel, or priming cock, 16, may be inserted in the upper portion of the pipe, 15.

The receptacle is provided with overflow openings, 17, and in the bottom may have a drain cock, 18.

The rear end of the drum is normally closed by a suitable valve, 19, carried by a bell-crank, 20, fulcrumed upon the drum and controlled by a rod, 21, which extends rearwardly through the dash and which the driver may move forwardly or rearwardly and accordingly open or close the valve.

To facilitate starting of the motor in cold weather, hot water is introduced into the receptacle, thereby heating the gasolene within the float-chamber, and as suction is created in the intake-manifold by turning of the motor, the steam from the hot water is drawn into the air-chamber, readily vaporizing the gasolene and rendering starting of the motor in the coldest weather very easy. As the engine becomes warm by running and the fan forces a continual current of air through the drum, the air is thereby heated, conducted to the receptacle and maintains the water therein at a high temperature.

Although it has been found that water remains in the receptacle during several hours continuous running of the motor, and that carburation is greatly improved and fuel conserved by the use of water, it is evident that the use of the latter is arbitrary after the motor becomes warm.

Should it not be desired to force the hot air into the receptacle, the valve, 19, may be opened to permit the air to pass directly through the drum in lieu of entering the conductor, 15.

Having thus described my invention, what I claim as new and desire to secure by Letters Patent of the United States, is,—

1. The combination with a carbureter including a float chamber and an air intake, of an air and water receptacle inclosing the float-chamber and communicating with the air-intake.

2. The combination with a gas-engine including an exhaust-conductor, a cooling-fan and a carbureter having an air-inlet, a water and air receptacle communicating with the air-inlet, a drum heated by the exhaust-conductor and adapted to receive air from the cooling-fan, and an air-conductor between the drum and receptacle.

3. The combination with a gas-engine including an exhaust-conductor, a cooling-fan and a carbureter having an air-inlet, of an air and water receptacle communicating with the air-inlet, a drum mounted upon the exhaust-conductor and adapted to receive air from the cooling-fan and convey the same to the receptacle, and means for controlling the passage of air to the receptacle.

4. The combination with a gas-engine including an exhaust-conductor, a cooling-fan and a carbureter having a float-chamber and an air-inlet, of an air and water receptacle inclosing the float-chamber and communicating with the air-inlet, and a drum mounted upon the exhaust-conductor and adapted to receive air from the cooling-fan and convey the same to the receptacle.

5. The combination with a gas-engine including an exhaust-conductor, a cooling-fan and a carbureter having a float-chamber and an air-inlet, of an open-ended air-drum mounted upon the exhaust-conductor and having one end directed toward the cooling-fan, a valve adapted to close the opposite end of the drum, an air and water receptacle inclosing the float-chamber and communicating with the air-inlet, and an air-conductor between the end of the drum adjacent the valve and the receptacle.

6. The combination with a gas-engine including an exhaust-conductor, a cooling-fan and a carbureter having an air-inlet, of an air-drum mounted upon the exhaust-conductor and adapted to receive air from the cooling-fan, and an air-conductor between the air-drum and the air-inlet.

7. The combination with a gas-engine including an exhaust-conductor, a cooling-fan and a carbureter having an air-inlet, of an open-ended air-drum mounted upon the exhaust-conductor and having its forward end directed toward the cooling-fan, a valve adapted to close the rear end of the air-drum, and an air-conductor between the air-inlet and the rear portion of the air-drum.

In testimony whereof I have hereunto set my hand.

OLE P. NELSON.